United States Patent

Westphal

[15] 3,706,987

[45] Dec. 19, 1972

[54] ALARM LOOP CIRCUIT SYSTEM WITH LIGHT-EMITTING CURRENT-DETECTION MEANS

[72] Inventor: Bruce A. Westphal, Piedmont, Calif.

[73] Assignee: Bay Alarm Company, Oakland, Calif.

[22] Filed: Aug. 23, 1971

[21] Appl. No.: 173,791

[52] U.S. Cl. ............................340/409 R, 340/253 B

[51] Int. Cl. ............................................G08b 29/00

[58] Field of Search.......................340/253 B, 409 R

[56] References Cited

UNITED STATES PATENTS 3,626,403 12/1971 Ive..................................340/409 X

*Primary Examiner*—Harold I. Pitts
*Attorney*—Oswald H. Milmore et al.

[57] ABSTRACT

An alarm system comprising a loop circuit having several remote, code-generating switches connected in series, and a receiving station connected to the loop ends which applies an electrical potential to the loop. Wherein the receiving station provides, in series with the loop ends, light-emitting diodes which emit light when current flows through the loop onto corresponding photo-sensitive circuit elements, such as photo transistors, which are connected, through amplifiers, to a controlled device, such as printing relays and/or further transmission means which indicate which diode emits more or less light than the other. Preferably, the amplifier outputs are connected through a time-delay circuit which produces an "off normal" signal if either of the diodes has a reduced light output for longer than a predetermined time, such as one to several seconds; this signal may energize another light-emitting diode or switch the power supply to apply a different voltage to a loop end.

10 Claims, 1 Drawing Figure

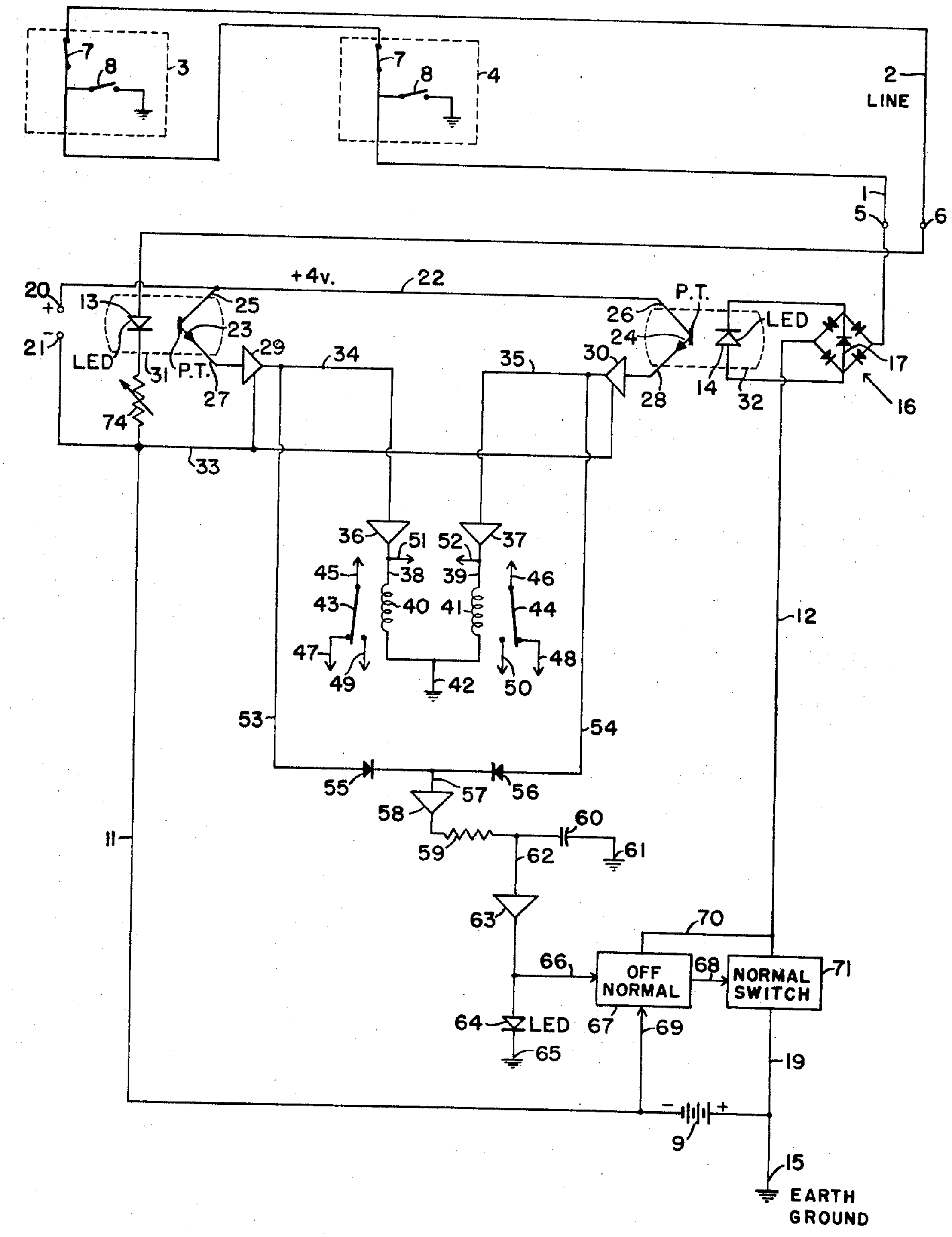
LINE
+4v.
P.T.
LED
LED
P.T.
OFF NORMAL
NORMAL SWITCH
LED
EARTH GROUND

ALARM LOOP CIRCUIT SYSTEM WITH LIGHT-EMITTING CURRENT-DETECTION MEANS

NATURE OF INVENTION

The invention relates to alarm systems having a loop circuit in which one or more remote switching stations are connected in series, the switches at each station being operated in accordance with a code either manually or automatically in response to a disturbance, such as a fire or an unauthorized entry, and a receiving station connected to the loop ends which applies an electrical potential to the loop and records and/or recognizes the code to identify the remote station. An example of such a system is the well-known McCulloh loop.

More particularly, the invention is concerned with improvements in the receiving station which permits a more dependable recognition of the coded signals despite lower current flows, and which better isolates the loop circuit from the code-recognition or other elements in the receiving station. In a preferred embodiment, the receiving station gives an indication of faults in the loop circuit by a signal device; further, this signal can automatically perform certain switching function, such as altering the voltage applied to one or both ends of the loop during the "off normal" condition to facilitate the reception of coded signals and returns the receiving station to its normal operating condition, called the "on normal" condition, when the fault has been remedied.

PRIOR PRACTICE

In prior practice, wherein a plurality of remote subscriber's premises to be protected, each containing switching stations connected serially in a loop circuit, such as a telephone line, were connected to a receiving station which applied a potential to the loop, relay windings were placed in series with the loop ends to control various operations, such as the printing of the received signals as manifested by variations in current flow. Thus, in the usual McCulloh loop, the receiving station applies a direct current potential of 50 to 300 volts, e.g., 130 volts with the positive grounded to earth, and during "on normal" operation the relay coils are energized while no remote switches are actuated; operation of the switches causes an interruption in the loop circuit, whereby the relays drop out and control other devices, such as a printer from the record of which the transmitting subscriber's station is recognized by the timed sequence of openings and groundings. The remote switching stations may be cam-operated or employ other means, such as the code wheel disclosed in the U.S. patent to E. A. Westphal, U.S. Pat. No. 3,385,943, May, 1968, which illustrates an example of the McCulloh loop.

In addition, the receiving stations were used to detect various faults in the loop circuit, such as an opening and/or a grounding thereof, the latter being at times accompanied by an opening and occurring on either or both sides of the opening. These conditions were manifested by a sustained dropping out of one or both relays, indicating an "off normal" condition. Corrective action usually involved operation of a switch by the attending operator to place similar potentials, e.g., negative potentials, on both loop ends to make it possible to receive signals on at least one of the relays.

DIFFICULTIES IN PRIOR PRACTICE

The operation of the relays in the receiving station were often sluggish due to the reactance in the loop circuit, which is usually inductive but may be reactive. Further, the relays did not respond dependably to weak signals, especially under "off normal" conditions, and give no indication of the varying intensity of the loop current.

Further, it was often difficult to recognize an "off normal" condition, and ammeters had to be monitored to detect it. Also, it was necessary in most situations to take a corrective action manually, due to the inability of receiving stations under all conditions to detect fault conditions. There is need for a device which automatically performs more corrective measures when a fault occurs.

Also, the prior systems did not effectively isolate the loop circuit from the controlled devices at the receiving station, making it difficult to perform certain controlled functions, such as the re-transmission of received signals by another circuit, wired or radio, e.g., by multiplexing the signals from several loop circuits. This was due, apart from the unknown reactance of the loop circuit, to transients caused by the inherent characteristics of relays, the contacts of which chatter and make such re-transmission or other functions difficult.

Finally, since relays usually do not have identical and known response characteristics, it was difficult in prior systems to determine the intensity of the current flowing through the loop. Only two conditions, operated and non-operated, are possible for relays, and these condition indicate only whether the current intensity is greater than or less than the unknown currents required for operation.

SUMMARY OF THE INVENTION

According to the invention, the receiving station, which is connected to the ends of the loop circuit having the coded switching stations connected in series, has means for applying an electrical potential to the loop ends and provides, in series with at least one and, preferably, both loop ends a separate light-emitting diode which is positioned near a corresponding photo-sensitive element, such as a photo transistor, the output(s) of said element being connected, preferably through an amplifier, to a circuit which controls the operation of a controlled device or devices, such as a relay connected to a printing device or means for generating or modulating another signal suitable for transmission via another circuit.

The receiving station preferably includes a time-delay circuit, connected at its source to the photo-sensitive element(s), through the same or a different amplifier, and having an output circuit (which includes an additional amplifier) which contains a signal indicative of the "off normal" condition. This signal appears when the diode(s) become darkened, and may be applied to another light-emitting diode to indicate the "off normal" condition, or to an audible alarm device, such as a buzzer. When two photo-sensitive elements are used, associated with separate light-emitting diodes in series with the loop ends, there is provided a logical "or" unit, such as a pair of diodes, having their inputs connected to the photo-sensitive devices and their common output to the time-delay circuit.

According to an optional though preferred feature, the signal in the output circuit mentioned in the preceding paragraph is applied to switching devices, such as electronic or relay devices, which apply electrical potentials to both ends of the loop, usually of the same polarity (e.g., both negative) and of the same or of different voltages. This switching operation continues so long as the fault condition persists, and is automatically reset to the "on normal" condition when the signal ceases.

GENERAL DESCRIPTION

At least one and, permissibly, both loop ends are connected to the receiving station by means that insure unidirectional flow of current through the associated light-emitting diode. This facilitates the use of diodes that operate only with current flow in one direction while permitting the polarity of the potential applied to the loop to be reversed, as in the "off normal" condition. Such means may use a bridge of diodes and is optional.

The amplifiers are usually individual, but a differential amplifier which detects differences in the voltages from the photo-sensitive circuit elements may be used, to indicate which one of the two diodes emits more or less light than the other. Such an amplifier may have a single output circuit or several output circuits which carry signals in accordance with the input voltages received from the photo-sensitive circuit elements. Although, theoretically, and assuming perfectly balanced conditions, the two light-emitting diodes are extinguished simultaneously upon operation of the remote switches under "on normal" condition, in practice the two diodes are not extinguished simultaneously, due to reactance and variable resistances in the two sides of the loop circuit, so that a difference signal is produced.

The photo-sensitive circuit elements associated with the series-connected, light-emitted diodes, may be of any suitable type, e.g., it may be a device that generates a potential in response to illumination, such as a photocell, or one which varies its resistance in response to illumination. Thus, this element may be a photo transistor, which has a high internal resistance when dark but a low resistance when illuminated.

The time-delay circuit may be single or cascaded and may employ any suitable circuit elements, such as resistors or inductances and capacitors, and provides a delay which is usually longer than the period of operation of the switch by a factor of about 4 to 20. Thus, if the switching stations transmit signals at intervals of one-twentieth to one-half seconds, the minimum delays are usually one-fifth to 2 seconds, and not longer than five times these periods. Since any operation of the switches causes a cessation of the light from the light-emitting diodes, it is necessary for this to persist for a period longer than the longest extinction due to an operation of the switch, before an "off normal" condition is signalled. Thus, theoretically, it would be possible to use shorter time-delay periods, down to twice the time that the switches remain operated, and this is the limit according to the invention, but it is preferred to use the longer delay periods stated to provide a safety factor; thereby the false indication of an "off normal" condition by a transient condition is avoided. Although the time-delay circuit may be energized by only one photo-sensitive circuit element, it is preferably responsive to either or both elements, and a suitable "or" gate combined the outputs. This gate may include a pair of blocking diodes, connected in accordance with the potential emitted by the photo-sensitive element or its amplifier. As a variant, a separate time-delay circuit may be connected to the output of each photo-sensitive circuit element and the delayed signals from the time-delay circuits can be combined by a similar "or" gate.

The "off normal" signal ceases after restoration of the normal condition, as indicated by the light-emitting diode(s). In the embodiment described, cessation is delayed by the period required for the time-delay circuit to recover, which is about equal to the time-delay period.

When the "off normal" signal is applied to perform switching functions, such as to alter the electrical potential applied to one or both ends of the loop circuit, many switching means and switching arrangements are possible, and it will be understood that the one indicated is merely illustrative. For example, when the receiving station under "on normal" operating condition applies earth-grounded +130 to the end of the loop having the bridge for causing unidirectional flow through the light-emitting diode and − 130 volts to the other loop end, the occurrence of an "off normal" signal can disconnect the grounded, positive side to its loop end and apply to the latter a negative voltage, which may be the same as or less than that applied to the other loop end. When electronic switching means are employed, as by altering the potential of a transistor, some voltage loss is inherent, and this may be increased by placing a voltage-dropping element, such as a Zenner diode, in series with the switch which is closed by the "off normal" signal. Thereby the negative voltage applied to the normally grounded positive loop end is less negative than that applied to the other loop end, e.g., 110 to 120 volts. Of course, mechanical switching means including relays can be used.

When the "off normal" signal ceases, the switches are restored to normal. Various circuitry to insure return of the switches to normal may be provided, but in the following description only the simplified embodiment, in which the switches persist in their "off normal" positions so long as the "off normal" signal persists, and are automatically returned to normal when that signal ceases, is described.

While, in the embodiment to be described, there is only one time-delay circuit, and the "off normal" signal is applied both to the indicating means and to the switching means, to economize on circuit elements, it is evident that the switching parts may have their independent time-delay circuits and amplifiers, and that the time-delay period of the indicator and switching means may be the same or different.

THE DRAWING

The single view of the drawing is a schematic diagram, shown partly as block diagrams indicating functions, of one, exemplary, preferred embodiment. The circuits to perform the functions of the blocks are within the skill of electronic technicians and designers.

DESCRIPTION — BASIC CIRCUIT

In the drawing, 1, 2 denote a loop circuit, such as a telephone line, having connected in series therewith any desired number, such as two to 12 or more, transmitting switching stations 3 and 4 which are located at the remote subscribers' stations to be protected and the ends of which are connected to the terminals 5 and 6 of a receiving station. The transmitting stations may be separated from the receiving station, as well as from one another, by large distances, often many kilometers.

Each switching station is located at premises whereat a disturbance, such as a fire or an unauthorized entry is sensed, and includes automatic or manually initiated means for operating the switches in accordance with a predetermined code. The invention is not restricted to any specific type of transmitting switching station nor to the codes, and the following is merely illustrative of the operation: Each switching station may include a normally closed switch 7 and a normally open switch 8 which connects one side of the loop circuit to earth ground. These may be embodied by a code wheel as described in the afore-mentioned U.S. Pat. No. 3,385,943 or may be cam-operated. Except for testing or other unusual purposes, the switch 7 is, upon operation, opened shortly before the switch 8 is closed (say 0.001 to 0.2 second earlier) and the durations of the periods between successive openings of the switches 7 (assuming a code which involved two or more successive openings) may be 50 to 500 milliseconds. Both switches 7 and 8 are operated for approximately one-half of the said periods.

The receiving station includes, according to the basic circuit, a source of electrical potential 9, represented by an electric storage battery of which the negative potential is applied by circuit 11, in series with a light-emitting diode 13, to the loop end connected to the terminal 6, and the positive potential is applied by circuits 19 and 12 (the switch 71 being closed), in series with a light-emitting diode 14 to the loop end connected to the terminal 5. One side of this source, usually the positive, is grounded to earth at 15. The potential is, for example, 130 volts d.c., although in some instances (as when the switching circuits are not used) alternating currents may be used. The connection to the circuit 12 includes a bridge 16 which insures that current always flows through the diode 14, regardless of the sign of the voltage applied to the circuit 12. This bridge has a voltage-dropping diode 17, including, one or a plurality of diodes. This circuit 16, 17, is known per se and is unnecessary with some light-emitting diodes; it may be applied also to the diode 13, but this is not essential with the operation to be described. For the basic circuit, the earth ground 15 may be regarded as connected directly to the circuit 12 and, in series with the diode 14, to the terminal 5.

While the receiving station has an earth ground only at 15 and the circuit 11 is at −130 volts to earth ground, the latter is at ground potential insofar as the various amplifiers and other circuit elements are concerned, a suitable d. c. potential, such as 4 volts, being applied to the terminals 20 and 21, the former being connected to a positive circuit 22 and the latter to the circuit 11. It will be realized that the various other grounds shown, other than 15, are to the circuit 11. Further, although only the photo-sensitive elements 23 and 24 are connected in the drawing to the circuit 22, other circuit elements are suitably connected to it for power.

Associated with each diode 13 and 14 (L.E.D.) is a photo-responsive circuit element 23 or 24, which may be a photo transistor having their bases unconnected. Their collectors are connected by circuits 25 and 26 to the positive circuit 22, and the emitters are connected by circuits 27 and 28 to the inputs of amplifiers 29 and 30, which are inverting, producing in their output circuits signals reversed in polarity to the input voltages. (In practice, one or more transistors are used in the amplifiers 29 and 30.) The diodes 13, 14, and their corresponding photo-sensitive circuit elements 23, 24, may be contained within common envelopes 31 or 32, and each pair can be supplied commercially as a unit. The amplifiers 29 and 30 are returned to internal ground via a circuit 33, and have their outputs connected to circuits 34 and 35, respectively. The amplifiers 29 and 30 are, obviously, optional.

The circuits 34 and 35 are connected to the inputs of amplifiers 36 and 37, respectively, (which are optional, especially when the amplifiers 29 and 30 are provided). They emit signals through their output circuits 38 and 39 the polarities of which depend on their constructions. When the outputs are positive upon a rise in the resistances of the photo transistors, they normally emit voltages, and energize the series-connected coils 40 and 41, which are connected to internal ground at 42, to actuate the armatures 43 and 44. The latter make connections of the circuits 45 and 46 either to the circuits 47 and 48 or to the circuits 49 and 50, respectively. These relay circuits control the operation of controlled devices, such as printers for recording indicia showing the time-related operations of the switches at the stations 3, 4, etc., or may control other functions. These functions being well known per se, are not further described herein.

As an example of one of such other functions, signals transmitted via another channel, e.g., to a central receiving station, can be generated or modulated in accordance with the potential in the circuits 38 and 39. For this purpose, branch circuits 51 and 52 are connected to the output circuits of the amplifiers 36 and 37, respectively, these branch circuits being connected to the transmitting station (not shown).

CIRCUIT WITH LINE FAULT INDICATOR

To give an indication of a line fault, the circuits 34 and 35 are connected via circuits 53 and 54, in series with blocking diodes 55 and 56, respectively (which are connected in accordance with the polarity of the outputs from the amplifiers 29 and 30 to transmit signals when the light-emitting diodes 13 and 14 are extinguished) to the input circuit 57 of an amplifier 58. The diodes 55 and 56 are arranged to form an "or" circuit, which energizes the circuit 57 whenever either or both of the circuits 53 and 54 is (are) energized. Again, the amplifier 58 is optional, and may be omitted when the signals in the circuits 53 and 54 are sufficiently strong.

The output from the amplifier 58 is connected to the input of a time-delay circuit, represented by a resistor 59 and a capacitor 60 which is connected to ground at 61. The output from this time-delay circuit appears in a circuit 62 which is connected through an optional amplifier 63 to a suitable signalling device, such as a light-emitting diode 64 which is grounded at 65. Obviously, audible signalling devices can be attached to the output from the amplifier 63.

CIRCUIT WITH AUTOMATIC SWITCHING FOR "OFF NORMAL"

The output from the optional amplifier 62 (or from the circuit 62) can be supplied via a branch circuit 66 to perform switching functions. Thus, circuit 66 can be connected to an "off normal" switch 67, which may be an electronic or mechanical device which, when no fault signal is received from the circuit 66, emits a "on normal" signal through the circuit 68. Thereby the switch 67 opens the circuit between the circuits 69 and 70 and closes the normal switch 71 (which may be an electronic or mechanical device) to apply the earth-grounded potential or circuit 19 to the circuit 12. This is the condition described earlier for the basic circuit.

When the circuit 66 carries a fault signal, the "off normal" switch 67 closes, and a corresponding signal is emitted through the circuit 68 to open the switch 71. This disconnects the circuits 19 and 12 are applies to the circuit 12, via circuit 70, a voltage similar to that in the circuit 11. If electronic switching is used, there is inherently a potential drop through the switching device, and it is often desirable to include in the switch 67 a voltage-dropping device, such as a Zenner diode, so that the potential in the circuits 70 and 12, when the switch 67 is closed, is about 110 or less to 120 volts, negative.

When the fault signal in the circuit 66 ceases the switch 67 and the switch 71 (through the circuit 68) are returned to their normal conditions, with the switch 67 open and the switch 71 closed.

OPERATION — BASIC CIRCUIT

Assuming "on normal" operation (with the loop circuit 1, 2 intact and ungrounded) the potential applied by the source 9 to the loop causes a steady current to flow through the loop circuit so long as the stations 3, 4, etc., are not operated. If desired, ammeters (not shown) can be provided to show visibly the intensity of this current. Such meters, when provided, would show, typically, a flow of 2 to 50 ma., assuming a potential of 130 volts and a loop resistance of from 65K to 2.6K ohms. This current flow can be reduced by providing a variable resistor 74 in series with the source, e.g., between the circuit 11 and the diode 13. The reduction in intensity is preferably such that the net current flow through the loop does not exceed a fixed value, such as 50 ma., preferably 20 ma. Alternatively, the current flow can be electronically controlled to a predetermined maximum by a device connected in series with the power source 9.

The light-emitting diodes 13 and 14 normally carry the full current which, acting on the photo transistors 23 and 24, reduce their resistances, causing the coils 40 and 41 to be energized (or de-energized, depending on the nature of the amplifiers 29, 30, 36 and 37). Whenever a remote switching station 3 or 4 is operated, opening of a switch 7 opens the loop current and the current flow ceases. The illumination emitted by both diodes ceases, causing the resistances in the photo transistors 23 and 24 to rise, thereby lowering the potential in the circuits 27 and 28. Thereby the amplifiers 29 and 30 and the amplifiers 36 and 37 emit signals which differ from those previously prevailing, e.g., changing from about zero to positive, and causing operation of the relay armatures 43 to cause printing in response to the operations of the openings of the switch 7. Grounding of the loop circuit 1 by the switch 8 has no effect in "on normal" operation, since it merely ensures that there is no potential on the circuit 1 and diode 14.

It is evident that if only one of the switches were operated at the remote station, opening of the switch 7 would cause both diodes 13 and 14 to be extinguished, while closing of switch 8 would cause only the diode 14 to be extinguished, causing, respectively, printing by both printers or only by that controlled by the armature 44. This permits recognition of faulty operation of the transmission station switching means.

Whenever there is a change in potential in the circuits 38 and/or 39, the branch circuits 51 and 52 similarly undergo changes in potential, causing the generation or modulation of a signal which is transmitted.

OPERATION — WITH FAULT LINE INDICATION

When an "off normal" condition occurs, the diode 13 and/or the diode 14 is darkened. Assuming the amplifiers 29 and 30 to invert the voltages, the circuits 53 and 54 are driven to positive, whereby the positive potential is applied to the circuit 57 by the diode 55 or 56. (Theses diodes would be reversed if the potentials at the outputs of the amplifiers 29 and 30 fall upon extinction of the diodes.) This applies a signal at the output of the amplifier 58 to the input of the time-delay circuit 59, 60, 61 and applies a signal of the same polarity after the time delay to the circuit 62 which, after amplification in the amplifier 63, is applied to the light-emitting diode 64 to indicate a fault.

Several faults may occur. When a break or opening of the loop circuit 1, 2, occurs, without any grounding (herein called "fault 1"), both diodes 13 and 14 are extinguished, causing positive voltages in the circuits 53 and 54. If, in addition to the break, the circuit 1, 2 is grounded at a point farther from the terminal 6 than the break (fault 2), both diodes are similarly extinguished, with the same consequence.

If, in addition to the circuit break, the circuit 1, 2, is grounded at a point farther from the terminal 5 than the break (fault 3) the 14 is again extinguished, but the diode 13 continues to be illuminated (although possibly at a reduced intensity). Thereupon the circuit 54 (but not the circuit 53) acquired a positive voltage, which is transmitted by the diode 56.

If grounds occur on both sides of a break in the loop circuit 1, 2, (fault 4) the result is as was described for fault 3.

Finally, if the circuit 1, 2 is grounded without any break (fault 5), the diode 13 continues to emit light while the diode 14 is extinguished, or, if the ground has a high resistance, may emit light at a reduced intensity. The extinction of the diode 14 or its operation at a reduced intensity causes a positive signal in the circuit 54, which is transmitted by the diode 56.

It is seen, therefore, that the circuit 57 is energized upon the occurrence of any of the five fault conditions described. The fault signal in circuit 57, amplified in amplifier 58 and delayed by the circuit 59, 60, 61, reaches the circuit 62 only after the predetermined time delay. When the signal in the circuit 57 does not persist for at least the time-delay period (as may be caused by a transient or by the operation of the switches 7 or 8) it does not raise the potential of the circuit 62 to the threshold level required to cause the amplifier 63 to emit a signal, and the diode 64 is not illuminated. (Also, the circuit 66 is not energized, for the purpose described hereinafter.) Thereafter the capacitor 60 gradually looses its charge and the time-delay circuit is restored to normal. It is only when the fault signal persists long enough for the circuit 62 to reach the threshold potential that the diode 64 (and the circuit 66) is energized. Hence no fault signal is indicated by normal operation of the remote switches.

Upon recognizing a fault condition, the attendant operator takes appropriate corrective action. Among these acts is the change of the voltage applied to the loop end through terminal 5; this usually involves applying a negative voltage to this circuit, by closing the switch 67 and opening the switch 71. This voltage is made less, in the preferred embodiment, than that applied to the terminal 6 so that it will not immediately cause the full illumination of the diode 14 and indicate a correction of the faults 3, 4 and 5. Thus, by including a Zenner diode in the circuit within the switch 67, there is a voltage drop and the current flowing through the diode 14 is lower than normal, at a level sufficient to cause actuation of relay armature 44 and consequent printing, but insufficient to avoid maintenance of the fault signal in the circuit 57 and, hence, in the diode 64.

When the fault condition is corrected, the signal in the circuit 57 ceases and, after the capacitor 60 has discharged to below the threshold level, the diode 64 is extinguished.

OPERATION — WITH AUTOMATIC SWITCHING FOR "OFF NORMAL"

When the circuit 66 and automatic switches at 67 and 71 are provided, switching is automatic. Whenever the circuit 66 has its potential raised, the normally open switch 67 is closed and the normally closed switch 71 is opened. This can be effected by providing power transistors in series and properly biasing an element, such as the base. As was previously stated, the switch 67 includes a Zenner diode or other circuit element for providing at 70 a negative voltage which is less than that of the circuit 69, whereby the circuit 12 is brought to a potential less than that of the circuit 11 and of the terminal 6. Without limiting the invention, it may be stated that typical voltages in the circuit 12 are from − 110 to − 120 volts when the terminal 6 is at about − 130 volts, but other voltages may be used, depending on the resistances of the loop circuit. Considerably lower negative voltages, down to 50 volts, may be applied, when necessary to avoid killing the fault signal under fault conditions 3, 4, and 5.

Application of a negative voltage on the terminal 5 causes sufficient illumination of the light-emitting diode 14 to permit printing and/or further transmission of the signals caused by the operations of the grounding switches 8, provided that the circuit fault is not between the transmitting station and the terminal 5.

When the fault is corrected, the potential in the circuit 68 falls to normal, such as zero, and the switch 67 is opened while the switch 71 is closed, thereby restoring the receiving station to "on normal" operation.

I claim as my invention:

1. In an alarm system which comprises a loop circuit having coded switching stations connected in series and a receiving station connected to the loop ends and including means for applying an electrical potential to the loop circuit, the improvement wherein the receiving station includes in series with at least one loop end a light-emitting circuit element which emits light in response to current flow, a photo-sensitive circuit element positioned to receive light from the light-emitting element, and an output circuit connected to the photo-sensitive element for controlling a device in accordance with the signal therein.

2. The alarm system according to claim 1 which includes a light-emitting circuit element in series with each loop end, there being a photo-sensitive element and an output circuit associated with each light-emitting element.

3. The alarm system according to claim 2 wherein said photo-sensitive devices are connected to said output circuits through amplifiers and said output circuits are connected to the coils of relay means which control printing of a record of the coded operations of the switching stations.

4. The alarm system according to claim 1 wherein said light-emitting element is a light-emitting diode and the photo-sensitive element is a photo transistor.

5. The alarm system according to claim 1 wherein said output circuit is connected to the input of a time-delay circuit having a delay longer than the period of operation of said switching stations and an output circuit connected to the time-delay circuit which is energized only when the signal from the photo-sensitive element persists for longer than a predetermined time.

6. The alarm system according to claim 5 wherein said output circuit from the time-delay circuit is connected to an alarm device.

7. The alarm system according to claim 5 wherein there is a light-emitting circuit element in series with each loop end, there are a photo-sensitive circuit element and a separate output circuit associated with each light-emitting element, and an "or" gate having its inputs connected to said separate output circuits and its common output circuit connected to the said input of the time-delay circuit.

8. The alarm system according to claim 7 wherein at least one of said photo-sensitive circuit elements is, additionally, connected through an amplifier to the coil of relay means which controls printing of a record of the coded operations of the switching stations.

9. In combination with the alarm system according to claim 5, switching means in said receiving station for altering the electrical potential which is applied to at least one of said loop ends.

10. The alarm system according to claim 5, wherein said receiving station includes switching means for normally applying a direct current potential to said loop ends and grounding one of said loop ends to earth, said switching means being responsive to the signal in said output circuit from the time-delay circuit for opening the connection between ground and said one loop end and applying to said one loop end an electrical potential, and for restoring said switching means to normal conditions upon cessation of the said signal.

* * * * *